(12) United States Patent
Cho

(10) Patent No.: US 12,263,822 B2
(45) Date of Patent: Apr. 1, 2025

(54) ELECTRIC BRAKE SYSTEM AND METHOD OF CONTROLLING THE SAME

(71) Applicant: HL MANDO CORPORATION, Gyeonggi-do (KR)

(72) Inventor: Youngeun Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 215 days.

(21) Appl. No.: 18/120,297

(22) Filed: Mar. 10, 2023

(65) Prior Publication Data
US 2023/0294651 A1 Sep. 21, 2023

(30) Foreign Application Priority Data
Mar. 10, 2022 (KR) .................. 10-2022-0030146

(51) Int. Cl.
*B60T 13/68* (2006.01)
*B60T 8/1761* (2006.01)
(Continued)

(52) U.S. Cl.
CPC .......... *B60T 13/686* (2013.01); *B60T 8/1761* (2013.01); *B60T 8/4081* (2013.01); *B60T 11/228* (2013.01); *B60T 13/745* (2013.01); *B60T 17/221* (2013.01)

(58) Field of Classification Search
CPC .... B60T 13/686; B60T 8/1761; B60T 8/4081; B60T 11/228; B60T 13/745;
(Continued)

(56) References Cited

U.S. PATENT DOCUMENTS 6,219,610 B1 * 4/2001 Araki ................... B60T 8/1755
701/72
6,450,591 B1 * 9/2002 Kawahata ............ B60T 8/3655
303/122.05

(Continued)

FOREIGN PATENT DOCUMENTS

EP           2520473        11/2012
KR    10-2018-0046009        5/2018
KR        10-1922592        11/2018

*Primary Examiner* — Phutthiwat Wongwian
*Assistant Examiner* — Brian R Kirby
(74) *Attorney, Agent, or Firm* — WOMBLE BOND DICKINSON (US) LLP

(57) ABSTRACT

Disclosed herein is an electric brake system including a reservoir, a master cylinder, a hydraulic pressure supply device configured to operate a hydraulic piston according to an electrical signal output in response to a displacement of a brake pedal and generate a hydraulic pressure, a hydraulic pressure control unit configured to control the hydraulic pressure transmitted to a wheel cylinder from the hydraulic pressure supply device, a hydraulic pressure auxiliary device configured to operate when the hydraulic pressure supply device is inoperable and provide the hydraulic pressure to two wheel cylinders and including a pair of pumps configured to pressurize the pressurizing medium, a motor configured to drive the pair of pumps, a first support valve provided on a first auxiliary hydraulic pressure flow path for transmitting the pressurizing medium pressurized by any one of the pair of pumps to a first wheel cylinder to control a flow of the pressurizing medium, and a second support valve provided on a second auxiliary hydraulic pressure flow path for transmitting the pressurizing medium pressurized by the other of the pair of pumps to a second wheel cylinder to control the flow of the pressurizing medium, a pressure sensor configured to detect pressures of the pressurizing media transmitted to the first support valve and the second
(Continued)

support valve from the pair of pumps, and a controller configured to control the hydraulic pressure supply device, the hydraulic pressure control unit, and the hydraulic pressure auxiliary device, wherein the controller is configured to estimate a wheel pressure of at least one control target wheel cylinder of the first wheel cylinder and the second wheel cylinder during ABS control in a first fallback mode performed by the hydraulic pressure auxiliary device, synchronize an upstream pressure and a downstream pressure of at least one control target support valve of the first support valve and the second support valve, and compensate the estimated wheel pressure of the control target wheel cylinder to be a pressure detected by the pressure sensor during the synchronization.

18 Claims, 8 Drawing Sheets

(51) Int. Cl.
*B60T 8/40* (2006.01)
*B60T 11/228* (2006.01)
*B60T 13/74* (2006.01)
*B60T 17/22* (2006.01)

(58) Field of Classification Search
CPC ............... B60T 17/221; B60T 13/142; B60T 2270/402; B60T 7/042; B60T 13/146; B60T 13/662; B60T 11/26; B60T 2270/14; B60Y 2400/306; B60Y 2400/81
USPC .................... 701/70, 72, 75; 303/11, 155
See application file for complete search history.

(56) References Cited

U.S. PATENT DOCUMENTS

| | | | | |
|---|---|---|---|---|
| 6,976,741 B2* | 12/2005 | Hara | ................... | B60T 8/17616 303/166 |
| 8,777,335 B2* | 7/2014 | Furuyama | ............... | B60T 17/22 303/155 |
| 2007/0164607 A1* | 7/2007 | Itoh | ........................ | B60T 8/4872 303/155 |
| 2009/0039702 A1* | 2/2009 | Nishino | ................... | B60T 7/042 303/114.1 |
| 2009/0091180 A1* | 4/2009 | Iwasaki | ..................... | B60T 8/90 303/11 |
| 2009/0096279 A1* | 4/2009 | Hosaka | ..................... | B60T 7/12 303/11 |
| 2009/0112433 A1* | 4/2009 | Park | ...................... | B60T 8/3655 701/71 |
| 2012/0007418 A1* | 1/2012 | Furuyama | ............... | B60T 17/22 303/11 |
| 2018/0334149 A1* | 11/2018 | Feigel | ................... | B60T 13/662 |

* cited by examiner

ELECTRIC BRAKE SYSTEM AND METHOD OF CONTROLLING THE SAME

CROSS-REFERENCE TO RELATED APPLICATION

This application claims the benefit of Korean Patent Application No. 10-2022-0030146, filed on Mar. 10, 2022 in the Korean Intellectual Property Office, the disclosure of which is incorporated herein by reference.

BACKGROUND

1. Field

Embodiments of the present disclosure relate to an electric brake system for generating a braking force using an electrical signal corresponding to a displacement of a brake pedal.

2. Description of the Related Art

Recently, electric brake systems, which each include a hydraulic pressure supply device for receiving a driver's braking intention as an electric signal from a pedal displacement sensor for detecting a displacement of a brake pedal when the driver steps on the brake pedal and supplying a hydraulic pressure required for braking to a wheel cylinder, are becoming widespread.

In the case of the conventional brake system in a combination of a vacuum booster and electronic stability control (ESC) device, since a volume of a master booster is sufficiently large due to mechanism and thus a constant upstream pressure of an inlet valve of a wheel is maintained while an anti-lock braking system (ABS) is operated by the driver, a wheel pressure during ABS operation can be accurately estimated from the upstream pressure of the inlet valve and a duty of the inlet valve.

However, in the electric brake system, it is difficult to accurately estimate the wheel pressure during ABS operation because it is difficult to control a motor to keep the constant upstream pressure of the inlet valve of the wheel during ABS operation. In other words, in the electric brake system, since it is impossible to generate an independent pressure for each hydraulic pressure circuit only with the motor due to a hydraulic pressure circuit structure, a pressure change of the hydraulic pressure circuit during ABS operation is large and thus a pressure control error occurs relatively often compared to the conventional brake system in which the duty of the inlet valve of the hydraulic pressure circuit is directly related to the wheel pressure.

SUMMARY

Therefore, it is an aspect of the present disclosure to provide an electric brake system and a method of controlling the same, which are capable of estimating a wheel pressure during anti-lock braking system (ABS) operation more accurately and reliably to improve ABS operation performance.

Additional aspects of the disclosure will be set forth in part in the description which follows and, in part, will be obvious from the description, or may be learned by practice of the disclosure.

In accordance with one aspect of the present disclosure, an electric brake system includes a reservoir in which a pressurizing medium is stored, a master cylinder configured to pressurize and discharge the pressurizing medium stored in the reservoir, a hydraulic pressure supply device configured to operate a hydraulic piston according to an electrical signal output in response to a displacement of a brake pedal and generate a hydraulic pressure, a hydraulic pressure control unit configured to control the hydraulic pressure transmitted to a wheel cylinder from the hydraulic pressure supply device, a hydraulic pressure auxiliary device configured to operate when the hydraulic pressure supply device is inoperable and provide the hydraulic pressure to two wheel cylinders and including a pair of pumps configured to pressurize the pressurizing medium, a motor configured to drive the pair of pumps, a first support valve provided on a first auxiliary hydraulic pressure flow path for transmitting the pressurizing medium pressurized by any one of the pair of pumps to a first wheel cylinder to control a flow of the pressurizing medium, a first discharge valve to control a discharge of the pressurizing medium of the first wheel cylinder to the reservoir, a second support valve provided on a second auxiliary hydraulic pressure flow path for transmitting the pressurizing medium pressurized by the other of the pair of pumps to a second wheel cylinder to control the flow of the pressurizing medium and a second discharge valve to control a discharge of the pressurizing medium of the second wheel cylinder to the reservoir, a pressure sensor configured to detect pressures of the pressurizing media transmitted to the first support valve and the second support valve from the pair of pumps, and a controller configured to control the hydraulic pressure supply device, the hydraulic pressure control unit, and the hydraulic pressure auxiliary device, wherein the controller is configured to estimate a wheel pressure of at least one control target wheel cylinder of the first wheel cylinder and the second wheel cylinder during ABS control in a first fallback mode performed by the hydraulic pressure auxiliary device, synchronize an upstream pressure and a downstream pressure of at least one control target support valve of the first support valve and the second support valve, and compensate the estimated wheel pressure of the control target wheel cylinder to be a pressure detected by the pressure sensor during the synchronization.

The control target support valve may be a normal closed type solenoid valve.

The control target support valve may be connected so that the pressurizing medium does not flow back even when the downstream pressure is higher than the upstream pressure.

The controller may be configured to fully open the control target support valve for a predetermined time to synchronize the upstream pressure and the downstream pressure of the control target support valve.

The controller may be configured to synchronize the upstream pressure and the downstream pressure of the control target support valve in a case of pressure boosting control of a first ABS control cycle, in a case in which a road surface is changed, or in a case in which two wheels ABS-controlled by the hydraulic pressure auxiliary device are both controlled to be decompressed.

The controller may determine whether to initiate the ABS control based on a wheel speed detected by a wheel speed sensor in the first fallback mode.

The controller may close the first and second support valves and open the first and second discharge valves, based on determining an initiation of the ABS control.

The controller may close the opened first discharge valve and the opened second discharge valve, drive the motor, and open the closed first support valve and the closed second support valve.

The controller may fully open the closed first support valve and the closed second support valve and then control a degree of opening of the fully open first support valve and the fully open second support valve.

The controller may compensate the estimated wheel pressure of the control target wheel cylinder with a pressure detected by the pressure sensor during fully opening the first support valve and the second support valve.

In accordance with another aspect of the present disclosure, a method of controlling an electric brake system including a reservoir in which a pressurizing medium is stored, a master cylinder configured to pressurize and discharge the pressurizing medium stored in the reservoir, a hydraulic pressure supply device configured to operate a hydraulic piston according to an electrical signal output in response to a displacement of a brake pedal and generate a hydraulic pressure, a hydraulic pressure control unit configured to control the hydraulic pressure transmitted to a wheel cylinder from the hydraulic pressure supply device, and a hydraulic pressure auxiliary device configured to operate when the hydraulic pressure supply device is inoperable and provide the hydraulic pressure to two wheel cylinders and including a pair of pumps configured to pressurize the pressurizing medium, a motor configured to drive the pair of pumps, a first support valve provided on a first auxiliary hydraulic pressure flow path for transmitting the pressurizing medium pressurized by any one of the pair of pumps to a first wheel cylinder to control a flow of the pressurizing medium, a first discharge valve to control a discharge of the pressurizing medium of the first wheel cylinder to the reservoir, a second support valve provided on a second auxiliary hydraulic pressure flow path for transmitting the pressurizing medium pressurized by the other of the pair of pumps to a second wheel cylinder to control the flow of the pressurizing medium and a second discharge valve to control a discharge of the pressurizing medium of the second wheel cylinder to the reservoir, the method including estimating a wheel pressure of at least one control target wheel cylinder of the first wheel cylinder and the second wheel cylinder during ABS control in a first fallback mode performed by the hydraulic pressure auxiliary device, synchronizing an upstream pressure and a downstream pressure of at least one control target support valve of the first support valve and the second support valve, detecting the upstream pressure of the control target support valve during the synchronizing through a pressure sensor configured to detect pressures of the pressurizing media transmitted to the first support valve and the second support valve from the pair of pumps, and compensating the estimated wheel pressure of the control target wheel cylinder to be the detected upstream pressure.

The control target support valve may be a normal closed type solenoid valve, and the synchronizing of the upstream pressure and the downstream pressure of the control target support valve may include fully opening the control target support valve for a predetermined time.

The synchronizing of the upstream pressure and the downstream pressure of the control target support valve may include synchronizing the upstream pressure and the downstream pressure of the control target support valve in a case of pressure boosting control of a first ABS control cycle, in a case in which a road surface is changed, or in a case in which two wheels ABS-controlled by the hydraulic pressure auxiliary device are both controlled to be decompressed.

The method further comprises determining whether to initiate the ABS control based on a wheel speed detected by a wheel speed sensor in the first fallback mode.

The method further comprises closing the first and second support valves and opening the first and second discharge valves, based on determining an initiation of the ABS control.

The method further comprises closing the opened first discharge valve and the opened second discharge valve, driving the motor, and opening the closed first support valve and the closed second support valve.

The opening of the closed first support valve and the closed second support valve may include fully opening the closed first support valve and the closed second support valve and then controlling a degree of opening of the fully open first support valve and the fully open second support valve.

The compensating of the estimated wheel pressure of the control target wheel cylinder may include compensating the estimated wheel pressure of the control target wheel cylinder with a pressure detected by the pressure sensor during fully opening the first support valve and the second support valve.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. Terms "unit, module, member, and block" used in the specification may be implemented as software or hardware, and according to the embodiments, each of a plurality of "units, modules, members, and blocks" may be implemented as one component or one "unit, module, member, and block" may also include a plurality of components.

Throughout the specification, when a certain portion is described as being "connected" to another, this includes not only a case of being directly connected thereto but also a case of being indirectly connected thereto, and the indirect connection includes connection through a wireless communication network.

In addition, when a certain portion is described as "including," a certain component, this means further including other components rather than precluding other components unless especially stated otherwise.

Throughout the specification, when a certain member is described as being positioned "on" another, this includes not only a case where the certain member is in contact with another but also a case where other members are present between the two members.

Terms such as first and second are used to distinguish one component from another, and the components are not limited by the above-described terms. A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Figure 1:
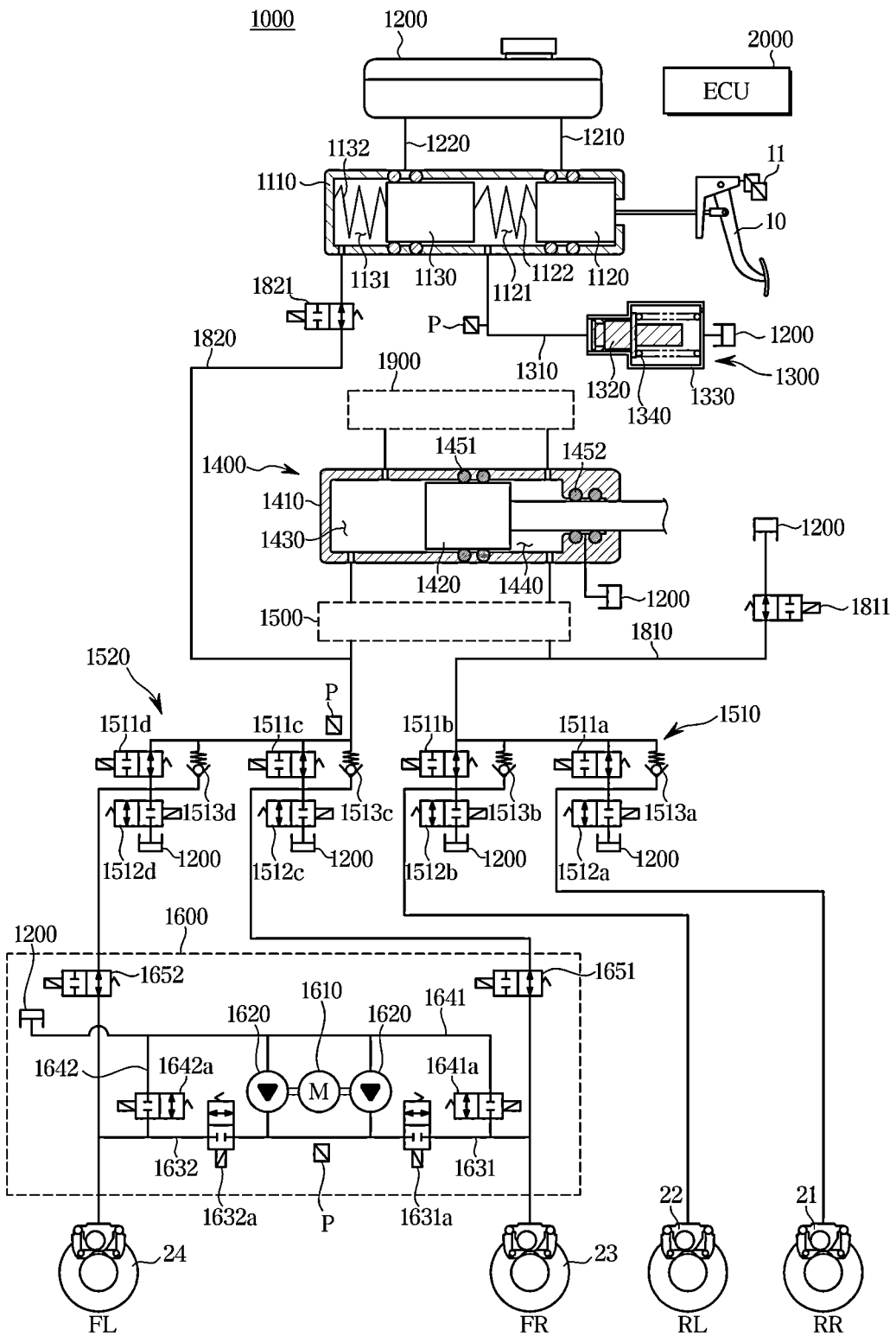
FIG. 1 is a hydraulic pressure circuit diagram showing an electric brake system according to an embodiment.

FIG. 1 is a hydraulic pressure circuit diagram showing an electric brake system according to an embodiment.

Referring to FIG. 1, an electric brake system 1000 includes a reservoir 1200 for storing a pressurizing medium, such as a brake oil, therein, a master cylinder 1100 for pressurizing and discharging the pressurizing medium accommodated therein by a pedal force of a brake pedal 10, a pedal simulator 1300 for providing a reaction force according to the pedal force of the brake pedal 10 to a driver, a hydraulic pressure supply device 1400 for receiving the driver's braking intention as an electrical signal by a pedal displacement sensor 11 for detecting a displacement of the brake pedal 10 and generating a hydraulic pressure of the pressurizing medium through a mechanical operation, a hydraulic pressure control unit 1500 for controlling the hydraulic pressure transmitted to a wheel cylinder, a hydraulic pressure auxiliary device 1600 for providing the hydraulic pressure to two wheel cylinders when the hydraulic pressure supply device 1400 is inoperable, a dump control unit 1900 hydraulically connecting the reservoir 1200 and the hydraulic pressure supply device 1400 to control a flow of the pressurizing medium between the reservoir 1200 and the hydraulic pressure supply device 1400, and a controller (electronic control unit (ECU)) 2000 for controlling an operation of each component based on hydraulic pressure information and pedal displacement information.

The master cylinder 1100 may be operated by the brake pedal 10 and may include at least one chamber and piston to pressurize and discharge a pressurizing medium therein.

Specifically, the master cylinder 1100 includes a cylinder block 1110, a first master chamber 1121 formed close to an inlet of the cylinder block 1110 to which the brake pedal 10 is connected, a first master piston 1120 provided in the first master chamber 1121, connected to the brake pedal 10, and provided to be displaced according to an operation of the brake pedal 10, a second master chamber 1131 formed inside the cylinder block 1110, a second master piston 1130 provided in the second master chamber 1131 and provided to be displaced by a hydraulic pressure formed in the first master chamber 1121 according to a displacement of the first master piston 1120, a first piston spring 1122 for elastically supporting the first master piston 1120, and a second piston spring 1132 for elastically supporting the second master piston 1130.

The first master chamber 1121 and the second master chamber 1131 may be sequentially formed inward (left side based on FIG. 1) from the brake pedal 10 (right side based on FIG. 1) in the cylinder block 1110. In addition, the first master piston 1120 and the second master piston 1130 may be coaxially disposed in the first master chamber 1121 and the second master chamber 1131, respectively, and may pressurize the pressurizing medium accommodated in each chamber or generate a negative pressure in each chamber according to forward and backward movement.

The pressurizing medium may flow into and be discharged from the first master chamber 1121 through a first hydraulic port and a second hydraulic port. The first hydraulic port may be connected to a first reservoir flow path 1210 so that the pressurizing medium flows from the reservoir 1200 into the first master chamber 1121, and a pair of sealing members may be provided in front of (left side based on FIG. 1) and behind (right side based on FIG. 1) the first hydraulic port to seal the first master chamber 1121. The second hydraulic port may be connected to a simulation flow path 1310 to be described below so that the first master chamber 1121 and the pedal simulator 1300 may be hydraulically connected at all times. Therefore, the pressurizing medium of the first master chamber 1121 may be discharged to the simulation flow path 1310 by the forward movement (left direction based on FIG. 1) of the first master piston 1120 and supplied to the pedal simulator 1300. A detailed description thereof will be described below.

The first master piston 1120 may be provided to be accommodated in the first master chamber 1121 and may move forward (left direction based on FIG. 1) to pressurize the pressurizing medium accommodated in the first master chamber 1121 or move backward (right direction based on FIG. 1) to generate the negative pressure inside the first master chamber 1121. Specifically, when the first master piston 1120 moves forward, as a volume of the first master chamber 1121 is reduced, the pressurizing medium that is present in the first master chamber 1121 may be pressurized to generate a hydraulic pressure and discharged to the simulation flow path 1310 to be described below. Conversely, when the first master piston 1120 moves backward, as the volume of the first master chamber 1121 increases, the pressurizing medium that is present in the first master chamber 1121 may be depressurized, and at the same time, may generate the negative pressure.

The pressurizing medium may flow into and be discharged from the second master chamber 1131 through a third hydraulic port and a fourth hydraulic port. The third hydraulic port may be connected to a second reservoir flow path 1220 so that the pressurizing medium flows from the reservoir 1200 to the second master chamber 1131, and a pair of sealing members may be provided in front of and behind the third hydraulic port to seal the second master chamber 1131. The fourth hydraulic port may be connected to a backup flow path 1820 to be described below to connect the second master chamber 1131 and a second hydraulic pressure circuit 1520. Therefore, when the hydraulic pressure supply device 1400 and the hydraulic pressure auxiliary device 1600, which will be described below, are inoperable, the pressurizing medium in the second master chamber 1131 may be discharged to the backup flow path 1820 by the forward movement of the second master piston 1130 to brake the third and fourth wheel cylinders 23 and 24 of the second hydraulic pressure circuit 1520. A detailed description thereof will be described below.

The second master piston 1130 may be provided to be accommodated in the second master chamber 1131 and may move forward to pressurize the pressurizing medium accommodated in the second master chamber 1131 or move backward to generate the negative pressure inside the second master chamber 1131. Specifically, when the second master piston 1130 moves forward, as a volume of the second master chamber 1131 is reduced, the pressurizing medium that is present in the second master chamber 1131 may be pressurized to generate the hydraulic pressure and discharged to the backup flow path 1820 to be described below. Conversely, when the second master piston 1130 moves backward, as the volume of the second master chamber 1131 increases, the pressurizing medium that is present in the second master chamber 1131 may be depressurized, and at the same time, may generate the negative pressure.

The first piston spring 1122 and the second piston spring 1132 are provided to elastically support the first master piston 1120 and the second master piston 1130, respectively. To this end, the first piston spring 1122 may be disposed between a front surface (left end based on FIG. 1) of the first master piston 1120 and a rear surface (right end based on FIG. 1) of the second master piston 1130, and the second piston spring 1132 may be disposed between a front surface (left end based on FIG. 1) of the second master piston 1130 and an inner surface of the cylinder block 1110. When a displacement occurs in the first master piston 1120 and the second master piston 1130 according to an operation of braking or the like, the first piston spring 1122 and the second piston spring 1132 may each be compressed, and then when the operation of the braking or the like is released, as the first piston spring 1122 and the second piston spring 1132 expand by an elastic force, each of the first master piston 1120 and the second master piston 1130 may be returned to their original positions.

The reservoir flow path is provided to hydraulically connect the reservoir 1200 and the master cylinder 1100. The reservoir flow path may include the first reservoir flow path 1210 connecting the first master chamber 1121 and the reservoir 1200 and the second reservoir flow path 1220 connecting the second master chamber 1131 and the reservoir 1200.

The pedal simulator 1300 may receive the pressurizing medium discharged from the first master chamber 1121 and provide the reaction force to the pedal force of the brake pedal 10 to the driver. The pedal simulator 1300 provides the reaction force in response to the pedal force applied to the brake pedal 10 by the driver, and thus it is possible to provide a pedal feeling to the driver, thereby performing a precise operation of the brake pedal 10 and also precisely adjusting the braking force of a vehicle.

The pedal simulator 1300 may include a simulation piston 1320 provided to be displaced by the pressurizing medium discharged from the first master chamber 1121 of the master cylinder 1100, a simulation chamber 1330 for discharging the pressurizing medium accommodated therein by the displacement of the simulation piston 1320 to the reservoir 1200, and a reaction spring 1340 for elastically supporting the simulation piston 1320.

The simulation piston 1320 is displaced by the pressurizing medium supplied from the first master chamber 1121 through the simulation flow path 1310. When the reaction spring 1340 is compressed by the displacement of the simulation piston 1320, as the volume of the simulation chamber 1330 is reduced, the pressurizing medium that is present in the simulation chamber 1330 is transmitted to the reservoir 1200. Meanwhile, even when the simulation piston 1320 returns to the original position as the operation of the brake pedal 10 is released, the pressurizing medium flows into the simulation chamber 1330 from the reservoir 1200 so that the pressurizing medium may filling the simulation chamber 1330 at all times. Therefore, when the pedal simulator 1300 operates, it is possible to minimize friction of the simulation piston 1320 so as to not only increase the durability of the pedal simulator 1300 and block the introduction of external foreign substances.

The reaction spring 1340 shown in the drawing is only an example in which the elastic force may be provided to the simulation piston 1320 and may be formed in various structures as long as it may store the elastic force. For example, the reaction spring 1340 may be made of a rubber material or the like, or formed of various members formed in a coil or plate shape to store the elastic force.

Describing the operation of the pedal simulator 1300, when the driver operates the brake pedal 10 to apply the pedal force thereto, as the first master piston 1120 moves forward, the pressurizing medium in the first master chamber 1121 is supplied to the front surface (left end based on FIG. 1) of the simulation piston 1320 via the simulation flow path 1310 to cause the displacement of the simulation piston 1320. At this time, the pressurizing medium filling the simulation chamber 1330 may be transmitted to the reservoir 1200, and as the simulation piston 1320 compresses the reaction spring 1340, the reaction force thereto is provided to the driver as the pedal feeling.

Then, when the driver releases the pedal force of the brake pedal 10, as the reaction spring 1340 expands by the elastic force, the simulation piston 1320 may return to the original position, and the pressurizing medium applied to the front surface of the simulation piston 1320 may return to the first master chamber 1121 via the simulation flow path 1310, and the simulation chamber 1330 may receive the pressurizing medium from the reservoir 1200 and may be re-filled with the pressurizing medium.

Since the simulation flow path 1310 according to the embodiment hydraulically connects the first master chamber 1121 of the master cylinder 1100 and the pedal simulator 1300 at all times, it is possible to implement the operation of the pedal simulator 1300 at all times not only in the normal operation mode, but also in a first fallback mode and a second fallback mode due to the inoperability of the component, thereby providing the same pedal feeling to the driver even in any situation.

The hydraulic pressure supply device 1400 is provided to receive the driver's braking intention as the electrical signal from the pedal displacement sensor 11 for detecting the displacement of the brake pedal 10 to implement the reciprocating movement of the hydraulic piston 1420, and thus generate the hydraulic pressure of the pressurizing medium.

The hydraulic pressure supply device 1400 may include a hydraulic pressure supply unit for providing a pressurizing medium pressure transmitted to the wheel cylinder and a power supply (not shown) for generating a driving force of the hydraulic piston 1420 based on the electrical signal of the pedal displacement sensor 11.

The hydraulic pressure supply unit includes a cylinder block 1410 provided so that the pressurizing medium may be accommodated, the hydraulic piston 1420 accommodated in the cylinder block 1410, and a sealing member provided between the hydraulic piston 1420 and the cylinder block 1410 to seal a pressure chamber.

The pressure chamber may include a first pressure chamber 1430 positioned in front of the hydraulic piston 1420 (left direction of the hydraulic piston 1420 based on FIG. 1) and a second pressure chamber 1440 positioned behind the hydraulic piston 1420 (right direction of the hydraulic piston 1420 based on FIG. 1). In other words, the first pressure chamber 1430 is provided to be partitioned by the cylinder block 1410 and the front surface of the hydraulic piston 1420 and provided so that a volume varies depending on the movement of the hydraulic piston 1420, and the second pressure chamber 1440 is provided to be partitioned by the cylinder block 1410 and the rear surface of the hydraulic piston 1420 and provided so that a volume varies depending on the movement of the hydraulic piston 1420.

The first pressure chamber 1430 may be hydraulically connected to a hydraulic pressure control unit 1500 to be described below by the hydraulic pressure flow path, and the second pressure chamber 1440 may also be hydraulically connected to the hydraulic pressure control unit 1500 by the hydraulic pressure flow path.

The sealing member includes a piston sealing member 1451 provided between the hydraulic piston 1420 and the cylinder block 1410 to seal between the first pressure chamber 1430 and the second pressure chamber 1440 and a driving shaft sealing member 1452 provided between the power supply and the cylinder block 1410 to seal a space between the second pressure chamber 1440 and the cylinder block 1410. A hydraulic pressure or a negative pressure of the first pressure chamber 1430 and the second pressure chamber 1440 generated by the forward or backward movement of the hydraulic piston 1420 may be sealed by the piston sealing member 1451 and the driving shaft sealing member 1452 and transmitted to the hydraulic pressure flow path without leakage.

The power supply may generate power and provide the power to the hydraulic piston 1420 according to an electrical signal. For example, the power supply may include a motor (not shown) for generating a rotational force and a power converter (not shown) for converting the rotational force of the motor into translational movement of the hydraulic piston 1420, but the present disclosure is not limited to the corresponding structure and device.

The dump control unit 1900 may be provided to hydraulically connect the hydraulic pressure supply device 1400 and the reservoir 1200 and to this end, may include a plurality of flow paths and various solenoid valves. The solenoid valve of the dump control unit 1900 is electrically operated and controlled by the controller 2000.

The first pressure chamber 1430 and the second pressure chamber 1440 may be connected to the reservoir 1200 via the dump control unit 1900. Through the dump control unit 1900, the first pressure chamber 1430 and the second pressure chamber 1440 may receive the pressurizing medium from the reservoir 1200 or conversely, transmit the pressurizing medium accommodated in the first pressure chamber 1430 and the second pressure chamber 1440 to the reservoir 1200.

The hydraulic pressure control unit 1500 is provided between the hydraulic pressure supply device 1400 and the wheel cylinder and provided so that an operation is controlled by the controller 2000 to adjust the hydraulic pressure transmitted to the wheel cylinder.

The hydraulic pressure control unit 1500 includes a first hydraulic pressure circuit 1510 for controlling the flow of hydraulic pressures transmitted to first and second wheel cylinders 21 and 22 among four wheel cylinders and a second hydraulic pressure circuit 1520 for controlling the flow of hydraulic pressures transmitted to third and fourth wheel cylinders 23 and 24 among the four wheel cylinders and includes a plurality of hydraulic pressure flow paths and solenoid valves to control the hydraulic pressures transmitted to the wheel cylinders from the integrated master cylinder 1100 and the hydraulic pressure supply device 1400.

The first wheel cylinder 21 and the second wheel cylinder 22 of the first hydraulic pressure circuit 1510 may be respectively provided on a rear right wheel RR and a rear left wheel RL, and the third wheel cylinder 23 and the fourth wheel cylinder 24 of the second hydraulic pressure circuit 1520 may be respectively provided on a front right wheel FR and a front left wheel FL. In other words, the first hydraulic pressure circuit 1510 and the second hydraulic pressure circuit 1520 are provided in a structure (F-R split) in which the front wheels and the rear wheels of a vehicle are independently controlled.

The first and second hydraulic pressure circuits 1510 and 1520 may include first to fourth inlet valves 1511*a*, 1511*b*, 1511*c*, and 1511*d* for controlling the flow of the pressurizing medium toward the first to fourth wheel cylinders 21, 22, 23, and 24. The first to fourth inlet valves 1511*a*, 1511*b*, 1511*c*, and 1511*d* may be respectively disposed at upstream sides of the first to fourth wheel cylinders 21, 22, 23, and 24 and provided as a normal open type solenoid valve that is normally open and operates so that the valve is closed when receiving an electrical signal from the controller 2000.

The first and second hydraulic pressure circuits 1510 and 1520 may include first to fourth check valves 1513*a*, 1513*b*, 1513*c*, and 1513*d* provided to be connected to be parallel to the first to fourth inlet valves 1511*a*, 1511*b*, 1511*c*, and 1511*d*. The first to fourth check valves 1513*a*, 1513*b*, 1513*c*, and 1513*d* may be provided on bypass flow paths connecting fronts and rears of the first to fourth inlet valves 1511*a*, 1511*b*, 1511*c*, and 1511*d* on the first and second hydraulic pressure circuits 1510 and 1520, may allow only the flow of the pressurizing medium discharged from each wheel cylinder, and block the flow of the pressurizing medium from the hydraulic pressure supply device 1400 to the wheel cylinder. The hydraulic pressure of the pressurizing medium applied to each wheel may be quickly discharged by the first to fourth check valves 1513*a*, 1513*b*, 1513*c*, and 1513*d*, and even when the first to fourth inlet valves 1511*a*, 1511*b*, 1511*c*, and 1511*d* do not normally operate, the hydraulic pressure of the pressurizing medium applied to the wheel cylinders may be smoothly discharged.

The first hydraulic pressure circuit 1510 may include first and second outlet valves 1512*a* and 1512*b* for adjusting the hydraulic pressure of the discharged pressurizing medium in order to improve performance when the braking of the first and second wheel cylinders 21 and 22 is released. The first and second outlet valves 1512*a* and 1512*b* may detect braking pressures of the first and second wheel cylinders 21 and 22 and may be selectively opened when decompression braking is required, such as in an anti-lock braking system (ABS) dump mode, to control decompression of the wheel cylinders. The first and second outlet valves 1512*a* and 1512*b* may be provided as a normal closed type solenoid valve that is normally closed and operates so that the valve is opened when receiving an electrical signal from the controller 2000.

The second hydraulic pressure circuit 1520 includes third and fourth outlet valves 1512*c* and 1512*d* for adjusting the hydraulic pressure of the discharged pressurizing medium in order to improve performance when the braking of the third and fourth wheel cylinders 23 and 24 is released. The third and fourth outlet valves 1512*c* and 1512*d* may detect braking pressures of the third and fourth wheel cylinders 23 and 24 and may be selectively opened when decompression braking is required, such as in the ABS dump mode, to control decompression of the wheel cylinders. The third and fourth outlet valves 1512*c* and 1512*d* may be provided as a normal closed type solenoid valve that is normally closed and operates so that the valve is opened when receiving an electrical signal from the controller 2000.

The hydraulic pressure auxiliary device 1600 may be provided on the third and fourth wheel cylinders 23 and 24 of the second hydraulic pressure circuit 1520 and may operate when the hydraulic pressure supply device 1400 is inoperable due to a failure or the like to generate and provide the hydraulic pressure required for the braking of the third and fourth wheel cylinders 23 and 24. A mode in which the hydraulic pressure auxiliary device 1600 operates due to inoperability of the hydraulic pressure supply device 1400 is referred to as the first fallback mode.

The hydraulic pressure auxiliary device 1600 includes a pair of pumps 1620 for pressurizing the pressurizing medium, a motor 1610 for driving the pair of pumps 1620, a first auxiliary hydraulic pressure flow path 1631 for transmitting the pressurizing medium pressurized by the pump 1620 to the third wheel cylinder 23, a second auxiliary hydraulic pressure flow path 1632 for transmitting the pressurizing medium pressurized by the pump 1620 to the fourth wheel cylinder 24, a first support valve 1631*a* provided on the first auxiliary hydraulic pressure flow path 1631 to control the flow of the pressurizing medium, a second support valve 1632*a* provided on the second auxiliary hydraulic pressure flow path 1632 to control the flow of the pressurizing medium, a first auxiliary dump flow path 1641 for discharging the pressurizing medium applied to the third wheel cylinder 23, a second auxiliary dump flow path 1642 for discharging the pressurizing medium applied to the fourth wheel cylinder 24 to the reservoir 1200, a first discharge valve 1641*a* provided on the first auxiliary dump flow path 1641 to control the flow of the pressurizing medium, a second discharge valve 1642*a* provided on the second auxiliary dump flow path 1642 to control the flow of the pressurizing medium, a first isolation valve 1651 for controlling the flow of the pressurizing medium transmitted to the third wheel cylinder 23 from at least any one of the master cylinder 1100 and the hydraulic pressure supply device 1400, and a second isolation valve 1652 for controlling the flow of the pressurizing medium transmitted to the fourth wheel cylinder 24 from at least any one of the master cylinder 1100 and the hydraulic pressure supply device 1400.

When the controller 2000 determines that the hydraulic pressure supply device 1400 is inoperable due to a failure or the like, the controller 2000 operates the hydraulic pressure auxiliary device 1600, specifically, the motor 1610. The motor 1610 may be operated by receiving the driver's braking intention as the electric signal from the pedal displacement sensor 11 for detecting the displacement of the brake pedal 10. The motor 1610 may receive power from a battery or the like to operate the pair of pumps 1620.

The pair of pumps 1620 may pressurize the pressurizing medium according to the reciprocating movement of a piston (not shown) provided in the motor 1610. The pump 1620 receives the pressurizing medium from the inlet-side flow path connected to the reservoir 1200 and pressurizes the pressurizing medium to correspond to a hydraulic pressure level required for braking by an operation of the motor 1610.

The pressurizing medium having the hydraulic pressure formed by any one of the pair of pumps 1620 may be transmitted to the third wheel cylinder 23 through the first auxiliary hydraulic pressure flow path 1631 provided on a discharge-side flow path of the pump 1620. To this end, the first auxiliary hydraulic pressure flow path 1631 may have an inlet side end connected to the discharge side of the pump 1620 and an outlet side end connected to the third wheel cylinder 23, and the first support valve 1631*a* for controlling the flow of the pressurizing medium transmitted to the third wheel cylinder 23 from the pump 1620 is provided on the first auxiliary hydraulic pressure flow path 1631. The first support valve 1631*a* may be provided as a normal closed type solenoid valve that is normally closed and operates so that the valve is opened when receiving an electrical signal from the controller 2000.

The pressurizing medium having the hydraulic pressure formed by the other one of the pair of pumps 1620 may be transmitted to the fourth wheel cylinder 24 by the second auxiliary hydraulic pressure flow path 1632 provided as the discharge-side flow path of the pump 1620. To this end, the second auxiliary hydraulic pressure flow path 1632 may have an inlet side end connected to the discharge side of the pump 1620 and an outlet side end connected to the fourth wheel cylinder 24, and the second support valve 1632*a* for controlling the flow of the pressurizing medium transmitted to the fourth wheel cylinder 24 from the pump 1620 is provided on the second auxiliary hydraulic pressure flow path 1632. Like the first support valve 1631*a*, the second support valve 1632*a* may be provided as a normal closed type solenoid valve that is normally closed and operates so that the valve is opened when receiving an electrical signal from the controller 2000.

The pressurizing medium applied to the third wheel cylinder 23 may be discharged through the first auxiliary dump flow path 1641. To this end, the first auxiliary dump flow path 1641 may have one end connected to the third wheel cylinder 23 or a downstream side of the first support valve 1631*a* of the first auxiliary hydraulic pressure flow path 1631 and the other end connected to the reservoir 1200 directly or the inlet side of the pump 1620. The first discharge valve 1641*a* for controlling the flow of the pressurizing medium discharged from the third wheel cylinder 23 is provided in the first auxiliary dump flow path 1641. The first discharge valve 1641*a* may be provided as a normal closed type solenoid valve that is normally closed and operates so that the valve is opened when receiving an electrical signal from the controller 2000.

The pressurizing medium applied to the fourth wheel cylinder 24 may be discharged through the second auxiliary dump flow path 1642. To this end, the second auxiliary dump flow path 1642 may have one end connected to the fourth wheel cylinder 24 or a downstream side of the second support valve 1632*a* of the second auxiliary hydraulic pressure flow path 1632, and the other end connected to the reservoir 1200 directly or the inlet side of the pump 1620. The second discharge valve 1642*a* for controlling the flow of the pressurizing medium discharged from the fourth wheel cylinder 24 is provided on the second auxiliary dump flow path 1642. Like the first discharge valve 1641*a*, the second discharge valve 1642*a* may be provided as a normal closed type solenoid valve that is normally closed and operates so that the valve is opened when receiving an electrical signal from the controller 2000.

Meanwhile, when the pressurizing medium is transmitted from the hydraulic pressure supply device 1400 or the master cylinder 1100 to the third and fourth wheel cylinders 23 and 24 during operation of the hydraulic pressure auxiliary device 1600, there is a risk of an accident because a level of the braking required by the driver and a level of braking actually implemented by the third and fourth wheel cylinders 23 and 24 are different. In addition, there is a problem in that the braking of the wheel cylinder is not implemented when the hydraulic pressure generated and provided from the hydraulic pressure auxiliary device 1600 is not completely transmitted to the third and fourth wheel cylinders 23 and 24 and leaks to other components.

Therefore, the first isolation valve 1651 and the second isolation valve 1652 of the hydraulic pressure auxiliary device 1600 are provided to allow and block the hydraulic connection between at least any one of the master cylinder 1100 and the hydraulic pressure supply device 1400 and the hydraulic pressure auxiliary device 1600.

The first isolation valve 1651 is provided between a downstream side of the third inlet valve 1511c of the third wheel cylinder 23 and the first auxiliary hydraulic pressure flow path 1631 to allow and block the flow of the pressurizing medium. The first isolation valve 1651 may be provided as a normal open type solenoid valve that is normally open and operates so that the valve is closed when receiving an electrical signal from the controller 2000. When the controller 2000 determines that the hydraulic pressure supply device 1400 is inoperable, the controller 2000 closes the first isolation valve 1651 so that the hydraulic pressure generated and provided from the hydraulic pressure auxiliary device 1600 is supplied to the third wheel cylinder 23 without leaking to the outside.

The second isolation valve 1652 is provided between a downstream side of the fourth inlet valve 1511d of the fourth wheel cylinder 24 and the second auxiliary hydraulic pressure flow path 1632 to allow and block the flow of the pressurizing medium. The second isolation valve 1652 may be provided as a normal open type solenoid valve that is normally open and operates so that the valve is closed when receiving an electrical signal from the controller 2000. When the controller 2000 determines that the hydraulic pressure supply device 1400 is inoperable, the controller 2000 closes the second isolation valve 1652 so that the hydraulic pressure generated and provided from the hydraulic pressure auxiliary device 1600 is supplied to the fourth wheel cylinder 24 without leaking to the outside.

A dump flow path 1810 may be provided to connect the first hydraulic pressure circuit 1510 and the reservoir 1200, and a dump valve 1811 for controlling the flow of the pressurizing medium may be provided on the dump flow path 1810. The dump valve 1811 may be provided as a normal open type solenoid valve that is normally open and operates so that the valve is closed when receiving a closing signal from the controller 2000.

In a normal braking situation, the dump valve 1811 is controlled in the closed state, and thus the hydraulic pressure provided from the hydraulic pressure supply device 1400 may be supplied to the first and second wheel cylinders 21 and 22 through the first hydraulic pressure circuit 1510 without leaking to the reservoir 1200.

Meanwhile, the electric brake system 1000 may directly supply the pressurizing medium discharged from the master cylinder 1100 to the second hydraulic pressure circuit 1520, when the hydraulic pressure auxiliary device 1600 is inoperable due to a failure or the like, to implement the braking of the third and fourth wheel cylinders 23 and 24. A mode in which the hydraulic pressure auxiliary device 1600 operates due to the inoperability of the hydraulic pressure supply device 1400 and the hydraulic pressure auxiliary device 1600 is referred to as the second fallback mode.

The backup flow path 1820 may be provided to connect the second master chamber 1131 of the master cylinder 1100 and the second hydraulic pressure circuit 1520, and a cut valve 1821 for controlling the flow of the pressurizing medium may be provided on the backup flow path 1820. The cut valve 1821 may be provided as a normal open type solenoid valve that is normally open and operates so that the valve is closed when receiving a closing signal from the controller 2000.

In a normal braking situation, the cut valve 1821 is controlled in the closed state, and thus the hydraulic pressure provided from the hydraulic pressure supply device 1400 may be supplied to the third and fourth wheel cylinders 23 and 24 through the second hydraulic pressure circuit 1520 without leaking to the master cylinder 1100. However, when the hydraulic pressure supply device 1400 and the hydraulic pressure auxiliary device 1600 are inoperable, the cut valve 1821 enters an open state, and thus the pressurizing medium provided from the second master chamber 1131 of the master cylinder 1100 may be supplied to the third and fourth wheel cylinders 23 and 24 through the backup flow path 1820, thereby performing braking.

The electric brake system 1000 further includes a plurality of pressure sensors P disposed in various flow paths to detect the hydraulic pressure of the pressurizing medium. FIG. 1 shows that the pressure sensor P is disposed on each of the simulation flow path 1310, the second hydraulic pressure circuit 1520, and the hydraulic pressure auxiliary device 1600, but is not limited to the corresponding positions and includes a case that is provided at various positions to detect the hydraulic pressure of the pressurizing medium.

Figure 2:
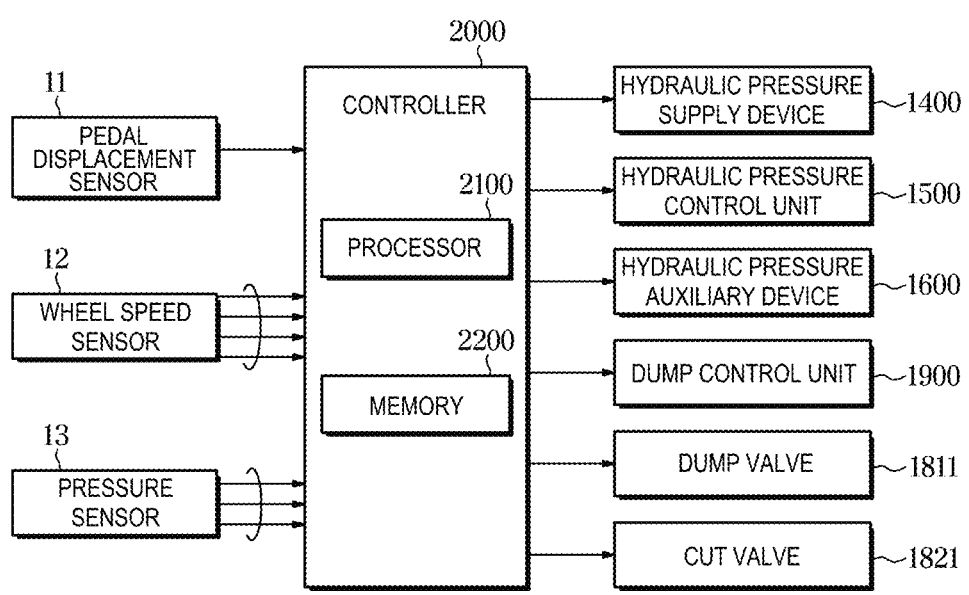
FIG. 2 is a control block of the electric brake system according to the embodiment.

FIG. 2 is a control block of the electric brake system according to the embodiment.

Referring to FIG. 2, the electric brake system 1000 includes the controller (ECU) 2000 for performing overall control.

The pedal displacement sensor 11, a wheel speed sensor 12, and a pressure sensor 13 are electrically connected to an input side of the controller 2000.

The pedal displacement sensor 11 may detect an operation and displacement of the brake pedal 10. The pedal displacement sensor 11 outputs a brake pedal signal indicating the operation and displacement of the brake pedal.

The wheel speed sensor 12 may detect a speed of each wheel. The wheel speed sensor 12 outputs wheel speed signals indicating the speed of each wheel.

The pressure sensor 13 may be disposed in various flow paths to detect the hydraulic pressure of the pressurizing medium. The pressure sensor 13 may be provided on the simulation flow path 1310 to detect the hydraulic pressure of the simulation flow path 1310, provided on the hydraulic pressure of the second hydraulic pressure circuit 1520 to detect the hydraulic pressure of the second hydraulic pressure circuit 1520, and provided on the first and second auxiliary hydraulic pressure flow paths 1631 and 1632 of the hydraulic pressure auxiliary device 1600 to detect the hydraulic pressures of the first and second auxiliary hydraulic pressure flow paths 1631 and 1632. The pressure sensor 13 outputs hydraulic pressure signals indicating the hydraulic pressure of the disposed flow path.

The hydraulic pressure supply device 1400, the hydraulic pressure control unit 1500, the hydraulic pressure auxiliary device 1600, the dump control unit 1900, the dump valve 1811, and the cut valve 1821 are electrically connected to an output side of the controller 2000. A motor driving signal for driving the motor and valve driving signals for driving the valves are output to the motor and the valves of the hydraulic pressure supply device 1400. Valve driving signals for driving the valves are output to the valves of the hydraulic pressure control unit 1500. Valve driving signals for driving the valves are output to the valves of the dump control unit 1900. Valve driving signals for driving each valve are output to the dump valve 1811 and the cut valve 1821. A motor driving signal is output to the motor 1610 of the hydraulic pressure auxiliary device 1600. In addition, valve driving signals for driving each valve are output to the first support valve 1631*a*, the second support valve 1632*a*, the first discharge valve 1641*a*, the second discharge valve 1642*a*, and the first isolation valve 1651 of the hydraulic pressure auxiliary device 1600.

The controller 2000 may be referred to as an ECU. The controller 2000 may include a processor 2100 and a memory 2200.

The memory 2200 may temporarily store detection data received from the pedal displacement sensor 11, the wheel speed sensor 12, and the pressure sensor 13 and temporarily store processing results of the detection data of the processor 2100.

The memory 2200 may include non-volatile memories, such as a flash memory, a read only memory (ROM), and an erasable programmable ROM (EPROM) as well as volatile memories, such as a static random access memory (SRAM) and a dynamic RAM (DRAM).

Hereinafter, an operation of the electric brake system 1000 will be described.

The operation of the electric brake system 1000 may perform a normal operation mode in which various devices and valves normally operate without failure or abnormality, a first fallback mode in which the hydraulic pressure auxiliary device 1600 intervenes in a state in which the hydraulic pressure supply device 1400 is inoperable, and a second fallback mode in which both the hydraulic pressure supply device 1400 and the hydraulic pressure auxiliary device 1600 are inoperable.

First, the normal operation mode of the electric brake system 1000 will be described.

Figure 3:
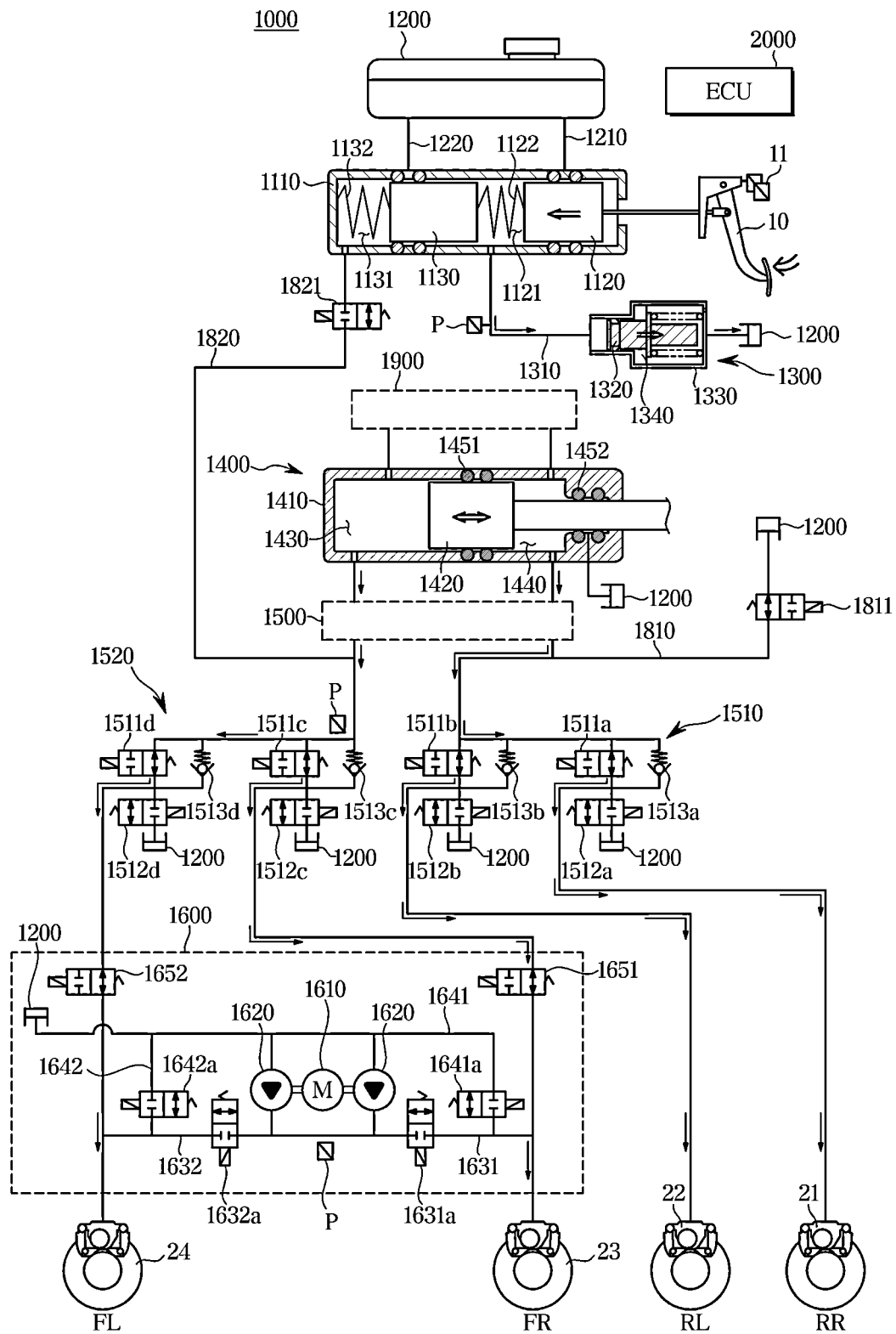
FIG. 3 is a hydraulic pressure circuit diagram showing a state in which the electric brake system according to the embodiment performs a normal operation mode.

FIG. 3 is a hydraulic pressure circuit diagram showing a state in which the electric brake system according to the embodiment performs a normal operation mode.

Referring to FIG. 3, when the electric brake system 1000 normally operates, the first master piston 1120 moves forward when the driver applies a pedal force to the brake pedal 10, and thus the pressurizing medium accommodated in the first master chamber 1121 is transmitted to the pedal simulator 1300 through the simulation flow path 1310. The pressurizing medium transmitted to the pedal simulator 1300 moves forward the simulation piston 1320 to compress the reaction spring 1340, and an elastic restoring force of the reaction spring 1340 is provided to the driver as a pedal feeling. At this time, the pressurizing medium accommodated in the simulation chamber 1330 is discharged to the reservoir 1200. Meanwhile, in the normal operation mode, since the cut valve 1821 is controlled in the closed state, the second master chamber 1131 is sealed.

The controller 2000 operates the hydraulic pressure supply device 1400 based on the displacement information of the brake pedal 10 detected by the pedal displacement sensor 11. The hydraulic piston 1420 of the hydraulic pressure supply device 1400 may generate the hydraulic pressure of the pressurizing medium accommodated in the pressure chamber by forward and backward movement and provide the pressurizing medium to the first to fourth wheel cylinders 21, 22, 23, and 24 via the hydraulic pressure control unit 1500 to perform braking.

In the normal operation mode, since the hydraulic pressure supply device 1400 is normally operated, the hydraulic pressure auxiliary device 1600 does not operate, and the first isolation valve 1651 and the second isolation valve 1652 maintain the open states so that the hydraulic pressure of the pressurizing medium supplied from the hydraulic pressure supply device 1400 may be smoothly provided to the third and fourth wheel cylinders 23 and 24. In addition, in the normal operation mode, since the dump valve 1811 is controlled in the closed state, the hydraulic pressure of the pressurizing medium supplied from the hydraulic pressure supply device 1400 may be provided to the first and second wheel cylinders 21 and 22 without leaking to the dump flow path 1810.

Figure 4:
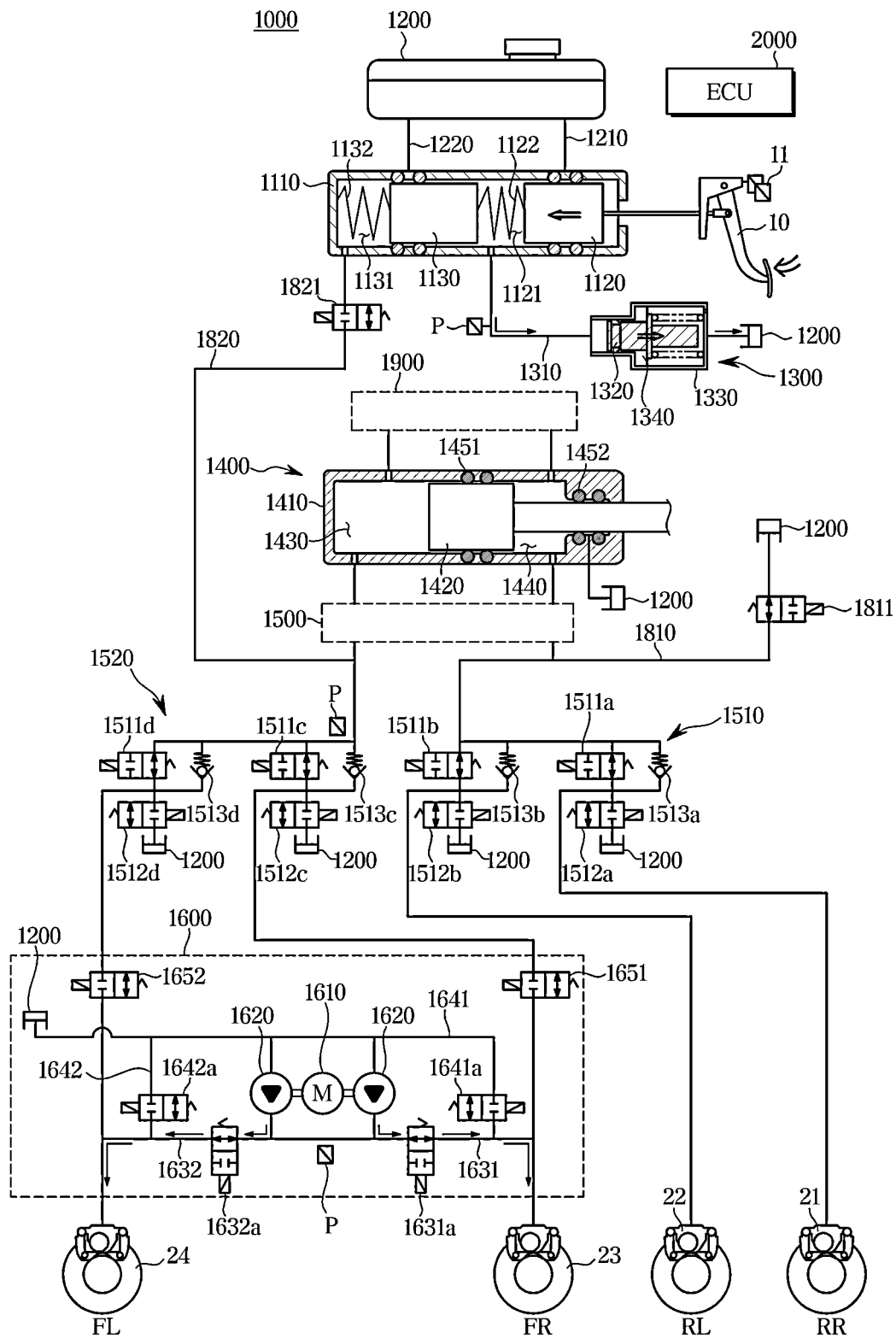
FIG. 4 is a hydraulic pressure circuit diagram showing a state in which a first fallback mode is performed when a hydraulic pressure supply device of the electric brake system according to the embodiment is stopped.

The electric brake system 1000 may be switched to enter the first fallback mode shown in FIG. 4 when the hydraulic pressure supply device 1400 corresponds to an inoperable state due to a failure, leakage of the pressurizing medium, etc.

FIG. 4 is a hydraulic pressure circuit diagram showing a state in which a first fallback mode is performed when a hydraulic pressure supply device of the electric brake system according to the embodiment is stopped.

Referring to FIG. 4, the controller 2000 is switched to enter the first fallback mode when determining that the hydraulic pressure supply device 1400 is in the inoperable state due to the failure or the like.

In the first fallback mode, when the driver applies the pedal force to the brake pedal 10, the first master piston 1120 moves forward, and thus the pressurizing medium accommodated in the first master chamber 1121 is transmitted to the pedal simulator 1300 via the simulation flow path 1310. The pressurizing medium transmitted to the pedal simulator 1300 moves the simulation piston 1320 forward to compress the reaction spring 1340, and an elastic restoring force of the reaction spring 1340 is provided to the driver as a pedal feeling. In other words, since the simulation flow path 1310 always maintains the open state, even in the first fallback mode, the pedal simulator 1300 may also provide the pedal feeling to the driver in the same manner. Meanwhile, in the normal operation mode, since the cut valve 1821 is controlled in the closed state, the second master chamber 1131 is sealed.

The controller 2000 operates the hydraulic pressure auxiliary device 1600 of the second hydraulic pressure circuit 1520 based on the displacement information of the brake pedal 10 detected by the pedal displacement sensor 11. When determining that the controller 2000 is in the first fallback mode, the controller 2000 closes the first isolation valve 1651 and the second isolation valve 1652 to hydraulically isolate the third and fourth wheel cylinders 23 and 24 from the hydraulic pressure supply device 1400. Then, the controller 2000 may control the operation of the motor 1610 of the hydraulic pressure auxiliary device 1600 based on the displacement information of the pedal, and the pair of pumps 1620 may generate the hydraulic pressure of the pressurizing medium by the operation of the motor 1610. The pressurizing medium having the hydraulic pressure formed by the pump 1620 may be transmitted to each of the third and fourth wheel cylinders 23 and 24 via the first and second auxiliary hydraulic pressure flow paths 1631 and 1632, and at this time, the first and second support valves 1631*a* and 1632a respectively provided on the first and second auxiliary hydraulic pressure flow paths 1631 and 1632 operate in the open states.

When the braking is released in the first fallback mode, the third and fourth wheel cylinders 23 and 24 of the second hydraulic pressure circuit 1520 may open the first and second discharge valves 1641a and 1642a disposed on the first and second auxiliary dump flow paths 1641 and 1642 to discharge the pressurizing medium applied to the third and fourth wheel cylinders 23 and 24, thereby performing the release of the braking.

In addition, the electric brake system 1000 may be switched to enter the second fallback mode when the hydraulic pressure supply device 1400 and the hydraulic pressure auxiliary device 1600 correspond to the inoperable state due to the failure, the leakage of the pressurizing medium, etc.

When the controller 2000 determines that the hydraulic pressure supply device 1400 and the hydraulic pressure auxiliary device 1600 are in the inoperable state due to the failure or the like, the controller 2000 is switched to enter the second fallback mode.

In the second fallback mode, each valve is controlled in the inoperable state. At this time, when the driver applies the pedal force to the brake pedal 10, the first master piston 1120 moves forward, and thus the pressurizing medium accommodated in the first master chamber 1121 is transmitted to the pedal simulator 1300 via the simulation flow path 1310. The pressurizing medium transmitted to the pedal simulator 1300 moves the simulation piston 1320 forward to compress the reaction spring 1340, and an elastic restoring force of the reaction spring 1340 is provided to the driver as a pedal feeling. Since the simulation flow path 1310 always maintains the open state, even in the second fallback mode, the pedal simulator 1300 can provide the pedal feeling to the driver in the same manner.

In the second fallback mode, since the cut valve 1821 is in the open state, the hydraulic pressure of the pressurizing medium generated in the first master chamber 1121 moves the second master piston 1130 forward, and thus the pressurizing medium accommodated in the second master chamber 1131 is transmitted to the second hydraulic pressure circuit 1520 via the backup flow path 1820. In the second fallback mode, since both the first and second isolation valves 1651 and 1652 maintain the open state, the pressurizing medium supplied from the second master chamber 1131 may be transmitted to the third and fourth wheel cylinders 23 and 24 to implement the braking.

Hereinafter, performing ABS control according to an ABS control cycle in the first fallback mode will be described.

When an ABS control situation occurs while the controller 2000 performs the first fallback mode, the controller 2000 performs the ABS control. In general, the ABS control refers to controlling a wheel pressure of each wheel so that each wheel does not tend to be excessively locked upon braking of a vehicle.

The controller 2000 monitors wheel speeds of the front left and right wheels FL and FR and a vehicle body speed using the wheel speed sensors 12 and selectively implements a decompression mode in which the first and second support valves 1631a and 1632a of the hydraulic pressure auxiliary device 1600 are in a closed state and the first and second discharge valves 1641a and 1642a are in an open state, a maintenance mode in which the first and second support valves 1631a and 1632a maintain a closed state and the first and second discharge valves 1641a and 1642a maintain a closed state, and a pressure boosting mode in which the first and second support valves 1631a and 1632a are in an open state and the first and second discharge valves 1641a and 1642a are in a closed state, thereby preventing the front left and right wheels FL and FR from being locked during the braking of the vehicle.

In addition, the controller 2000 operates the motor 1610 of the hydraulic pressure auxiliary device 1600 when performing the ABS control in the first fallback mode to allow the pair of pumps 1620 to pump the pressurizing medium in the reservoir 1200 to be supplied to the third and fourth wheel cylinders 23 and 24 via the second auxiliary hydraulic pressure flow paths 1631 and 1632.

The ABS control cycle is executed repeatedly while the ABS control is operated. Based on the wheel speed detected by the wheel speed sensor 12, the controller 2000 determines whether there is an excessive slipped wheel among the front left and right wheels FL and FR to determine whether the ABS control is required. Based on the wheel speed, a wheel acceleration and deceleration, which is a differential value of the wheel speed and the like, a pressure control mode in which the wheel pressure of each wheel is controlled so that a slip rate of the excessively slipped wheel is within an appropriate range is determined to be any one of the decompression mode, the maintenance mode, and the pressure boosting mode. According to the type of the determined pressure control mode, the first and second support valves 1631a and 1632a and the first and second discharge valves 1641a and 1642a of the hydraulic pressure auxiliary device 1600 are controlled, and the motor 1610 is controlled. Therefore, one ABS control cycle is finished.

Hereinafter, for convenience of description, only the ABS control of the front left wheel FL among the front left and right wheels FL and FR will be described.

Figure 5:
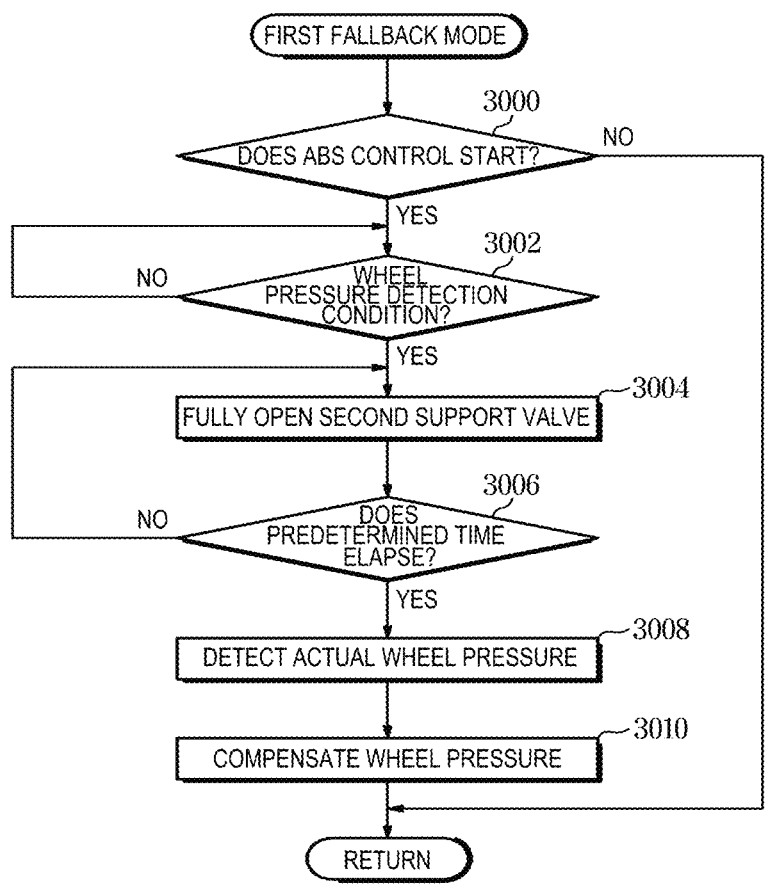
FIG. 5 is a flowchart showing a method of controlling the electric brake system according to the embodiment.
Figure 6:
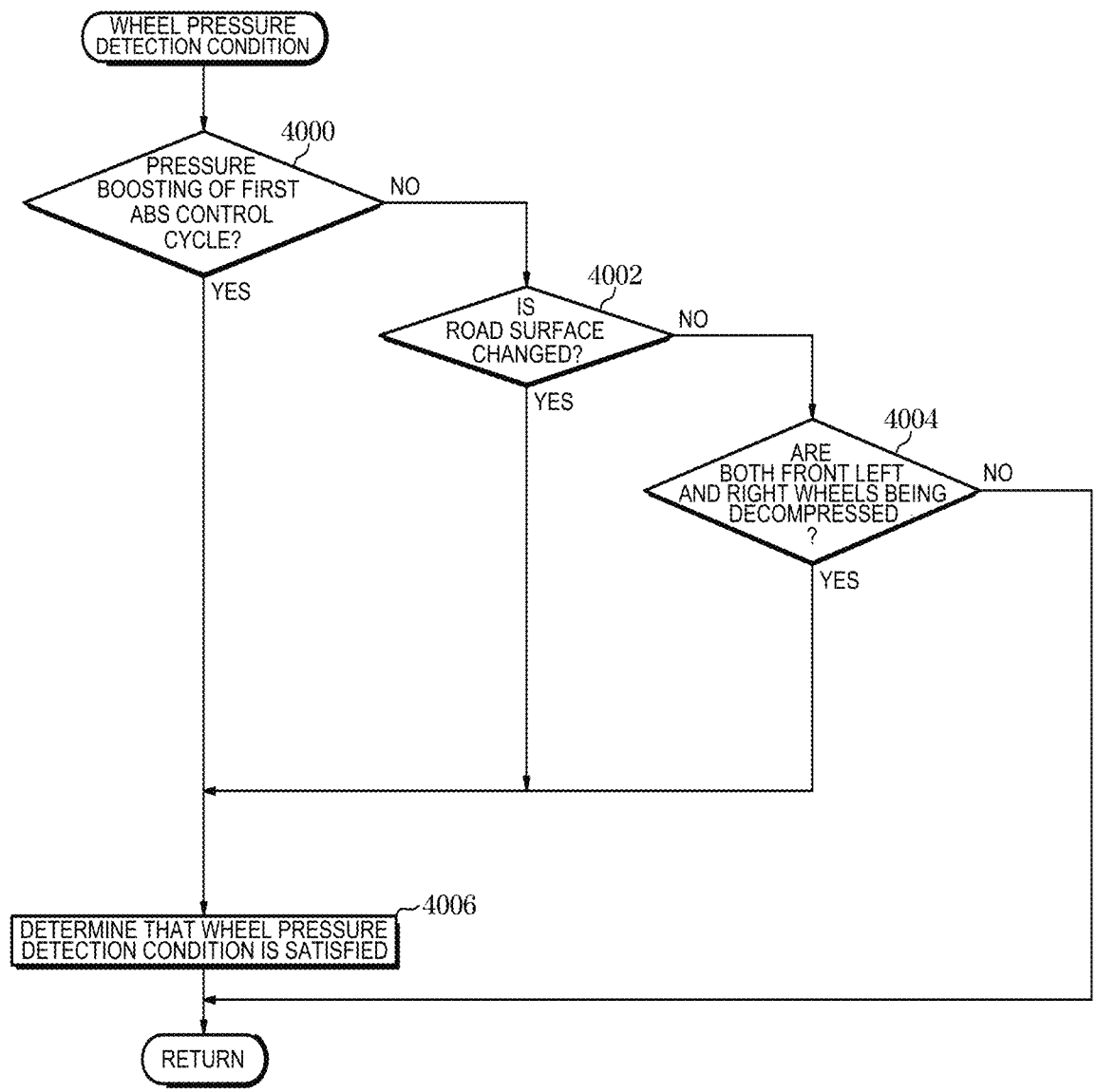
FIG. 6 is an operation of determining whether a wheel pressure detection condition is satisfied in the method of controlling the electric brake system according to the embodiment.

FIG. 5 is a flowchart showing a method of controlling the electric brake system according to the embodiment, and FIG. 6 is an operation of determining whether a wheel pressure detection condition is satisfied in the method of controlling the electric brake system according to the embodiment.

Referring to FIGS. 5 and 6, a method of controlling the electric brake system according to the embodiment includes determining whether the ABS control starts in the first fallback mode (3000), determining whether a wheel pressure detection condition is satisfied when the ABS control starts (3002), fully opening the second support valve 1632a of the hydraulic pressure auxiliary device 1600 for a predetermined time when the wheel pressure condition is satisfied (3004 and 3006), detecting an actual wheel pressure through the pressure sensor 13 when the predetermined time elapses (3008), and compensating an estimated wheel pressure to be an actual wheel pressure (3010).

At a pressure boosting time point (4000) of a first ABS control cycle, a time point (4002) when a road surface is changed, or a time point (4004) when both the front left and right wheels FL and FR are being decompressed, it may be determined that the wheel pressure detection condition is satisfied (4006).

Figure 7:
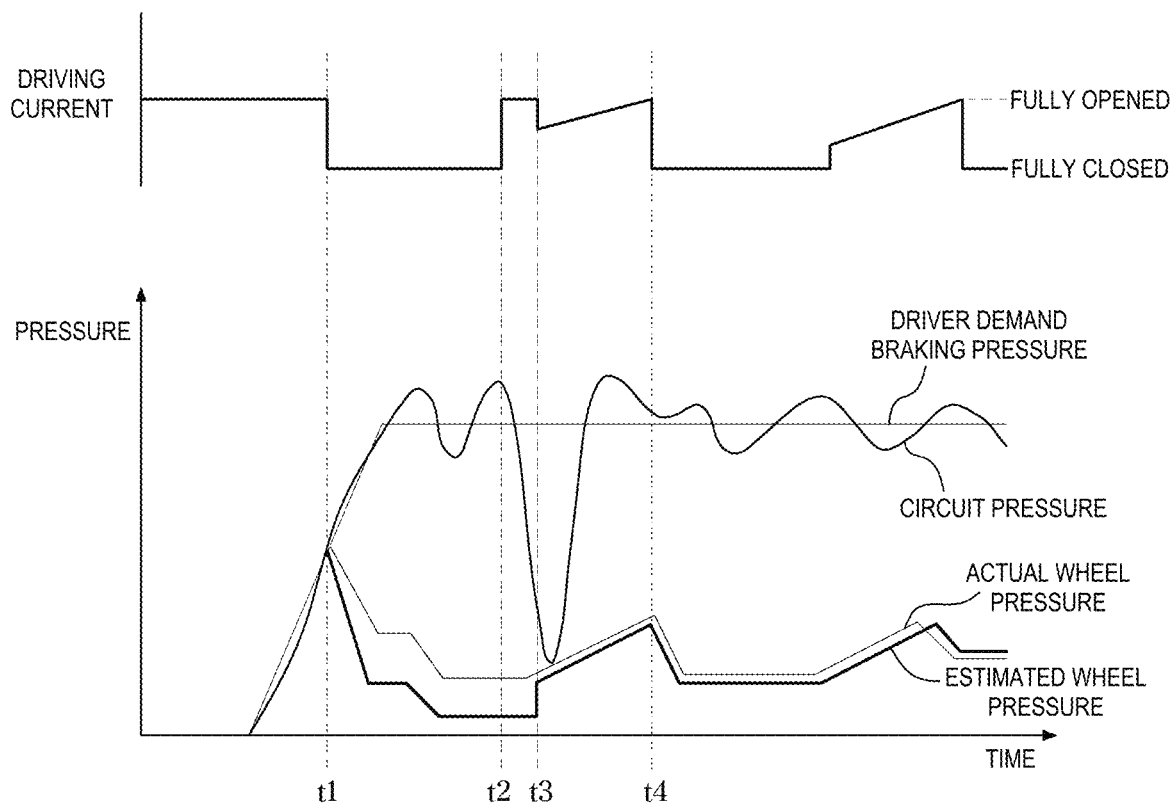
FIG. 7 is a timing chart showing changes in a driver demand braking pressure, a circuit pressure, an actual wheel pressure, an estimated wheel pressure, and a command current of a second support valve when ABS is controlled in a first fallback mode of the electric brake system according to the embodiment.
Figure 8:
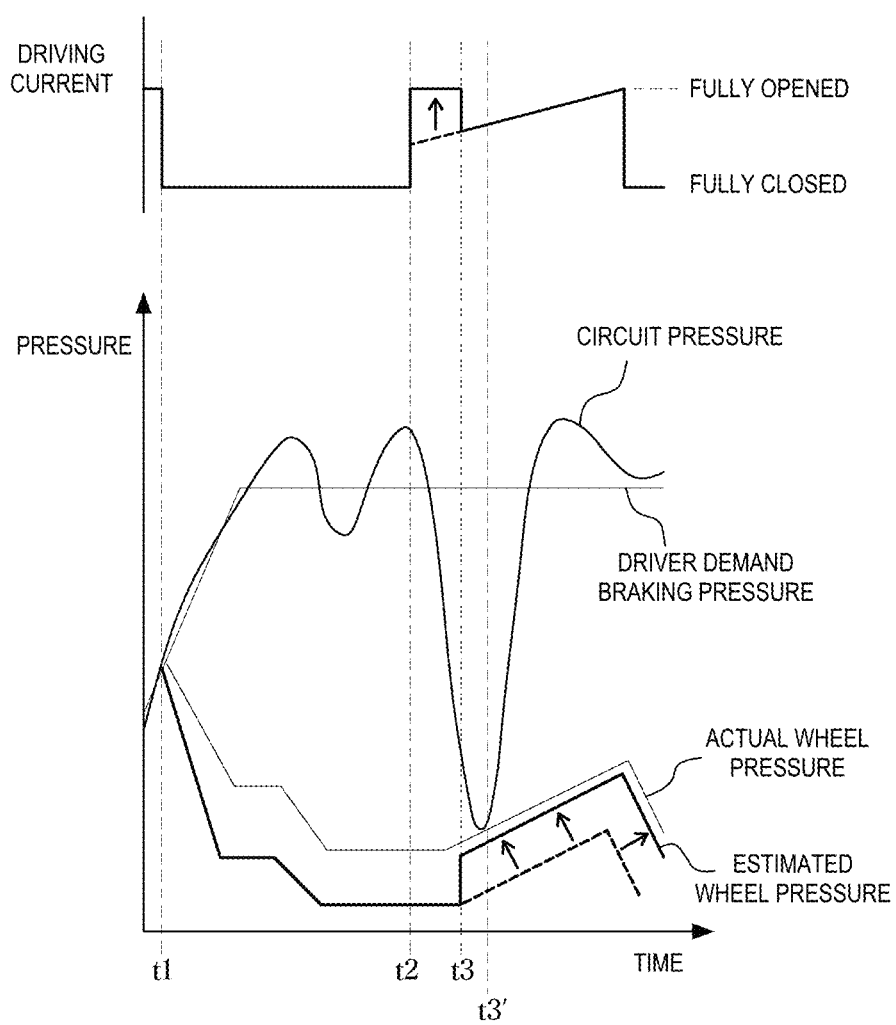
FIG. 8 shows compensating the estimated wheel pressure in FIG. 7 to be the actual wheel pressure.

FIG. 7 shows a timing chart showing changes in a driver demand braking pressure, a circuit pressure, an actual wheel pressure, an estimated wheel pressure, and a command current of a second support valve when ABS is controlled in a first fallback mode of the electric brake system according to the embodiment, and FIG. 8 shows compensating the estimated wheel pressure in FIG. 7 to be the actual wheel pressure.

Referring to FIGS. 7 and 8, when the ABS control starts, in order to reduce the wheel pressure in the wheel cylinder 24, decompression control in which the second support valve 1632a enters the closed state and at the same time, the second discharge valve 1642a enters the open state is performed. In order to maintain the wheel pressure in the wheel cylinder 24, maintenance control in which the second support valve 1632a is in the closed state and at the same time, the second discharge valve 1642a is in the closed state is performed. Then, in order to boost the wheel pressure in the wheel cylinder 24, pressure boosting control in which the second support valve 1632a enters the open state and at the same time, the second discharge valve 1642a enters the closed state is performed.

A command current value supplied to the second support valve 1632a during ABS control is determined by a predetermined feature map. The predetermined feature map may be a map indicating the relationship between an estimated differential pressure value between a wheel pressure and a circuit pressure, which are a downstream pressure and an upstream pressure of the second support valve 1632a, and the command current value supplied to the second support valve 1632a.

The second support valve 1632a is controlled using a pulse width modulation (PWM) method of varying a duty ratio of a supplied voltage. The second support valve 1632a is controlled by linear flow control (LFC) that linearly increases a wheel pressure by adjusting an opening degree of a valve through duty control of a driving current value.

The wheel pressure in the wheel cylinder 24 may be estimated from the circuit pressure, which is the upstream pressure of the second support valve 1632a, and the duty ratio of the second support valve 1632a. At this time, the circuit pressure is the pressure of the pressurizing medium discharged from the pump 1620 of the hydraulic pressure auxiliary device 1600 and introduced into the second support valve 1632a. This circuit pressure is detected by the pressure sensor 13.

Before a time point t1, the first fallback mode is performed. In the first fallback mode, the third and fourth wheel cylinders 23 and 24 are hydraulically isolated from the hydraulic pressure supply device 1400 by closing the first isolation valve 1651 and the second isolation valve 1652. Then, the operation of the motor 1610 of the hydraulic pressure auxiliary device 1600 is controlled according to the driver demand braking pressure determined from the displacement information of the brake pedal 10 detected by the pedal displacement sensor 11. By the operation of the motor 1610, the pair of pumps 1620 generates the hydraulic pressure of the pressurizing medium. The pressurizing medium having the hydraulic pressure formed by the pump 1620 may be transmitted to each of the third and fourth wheel cylinders 23 and 24 via the first and second auxiliary hydraulic pressure flow paths 1631 and 1632, and at this time, the first and second support valves 1631a and 1632a respectively provided on the second auxiliary hydraulic pressure flow paths 1631 and 1632 are in the open state.

Since the ABS control is not executed before the time point t1, the actual wheel pressure is the same as the driver demand braking pressure (or the circuit pressure).

When the ABS control starts at the time point t1, in order to reduce the wheel pressure in the wheel cylinder 24, the decompression control in which the second support valve 1632a enters the closed state and at the same time, the second discharge valve 1642a enters the open state is performed. Since the second support valve 1632a is in the open state, the second support valve 1632a is switched to enter the closed state. At the same time, the second discharge valve 1642a in the closed state is switched to enter the open state.

As a result, the first ABS control cycle (first ABS control) starts, and at the same time, the actual wheel pressure starts to be reduced.

At a time point t2, the pressure boosting control starts. In order to boost the wheel pressure in the wheel cylinder 24, the second support valve 1632a is switched to enter the open state, and at the same time, the second discharge valve 1642a is switched to enter the closed state. At this time, the command current value supplied to the second support valve 1632a may be determined from the relationship between the estimated differential pressure value between the wheel pressure and the circuit pressure, which are the downstream pressure and the upstream pressure of the second support valve 1632a, and the command current value supplied to the second support valve 1632a. The command current value is also reduced linearly according to the estimated differential pressure value that is linearly reduced during the pressure boosting control. As a result, the actual wheel pressure starts to increase.

The pressure boosting control continues until the ABS control start condition is satisfied again. In addition, at a time point t4, since the ABS control start condition is satisfied again, the pressure boosting control being executed is stopped to finish the first ABS control, and at the same time, a second ABS control starts in the same order as the first ABS control.

Meanwhile, since the circuit pressure is not constant and fluctuates from the time point t1 to the time point t2 when the pressure boosting control starts, the estimated wheel pressure that is estimated based on the circuit pressure does not accurately reflect the actual wheel pressure and has a relatively lower than the actual wheel pressure. Therefore, since the actual wheel pressure is not accurately estimated, ABS operation performance can be degraded.

Therefore, instead of smoothly increasing a driving current of the second support valve 1632a as indicated by the dotted line from the time point t2 when the pressure boosting control starts to the time point t4, a maximum driving current using which the second support valve 1632a can be fully opened as indicated by the solid line from the time point t2 to a time point t3 may be supplied to fully open the second support valve 1632a. Since the second support valve 1632a is fully opened for a predetermined time from the time point t2 to the time point t3, the circuit pressure, which is the upstream pressure of the second support valve 1632a, is reduced to the actual wheel pressure. At this time, when the circuit pressure is detected through the pressure sensor 13 at a time point t3' when the circuit pressure is reduced to the actual wheel pressure, the actual wheel pressure can be known because the detected pressure value at that time is the actual wheel pressure. In addition, the estimated wheel pressure is compensated to be the actual wheel pressure.

As described above, the circuit pressure that may be detected by the pressure sensor 13 may be reduced to the actual wheel pressure level by fully opening the second support valve 1632a to communicate the upstream and downstream. Therefore, the upstream pressure and the downstream pressure of the second support valve 1632a are synchronized in a balanced manner. When the circuit pressure is detected through the pressure sensor 13 after the upstream pressure and the downstream pressure are synchronized, this is the actual wheel pressure, and thus the estimated wheel pressure incorrectly estimated as indicated by the dotted line may be compensated to the actual wheel pressure level as indicated by the solid line. Since the second support valve 1632a is connected so that the pressurizing medium does not flow back even when the downstream pressure is higher than the upstream pressure, the pressure synchronization is possible. In other words, since there is no check valve connecting the upstream and downstream of the second support valve 1632a, the pressurizing medium does not flow back even when the downstream pressure is higher than the upstream pressure, and thus the pressure synchronization is possible.

During ABS operation, the second support valve 1632a is fully opened intermittently to synchronize the upstream pressure and the downstream pressure to compensate the estimated wheel pressure.

When the pressure synchronization is frequently performed to detect the wheel pressure during ABS operation, this may adversely affect ABS operation performance, and thus pressure synchronization is performed at a time point when the influence on the change in the road surface and ABS control cycle can be minimized to compensate the estimated wheel pressure to be the actual wheel pressure. For example, such a time point may be the pressure boosting time point of the first ABS control cycle, the time point when the road surface is changed, the time point when both the front left and right wheels FL and FR are being decompressed, etc.

As is apparent from the above description, it is possible to estimate a wheel pressure during ABS operation more accurately and reliably, thereby improving ABS operation performance.

Meanwhile, the above-described controller and/or the components thereof may include one or more processor/microprocessor(s) coupled to a computer-readable recording medium storing computer-readable code/algorithm/software. The processor(s)/microprocessor(s) may execute the computer-readable code/algorithm/software stored in the computer-readable recording medium to perform the above-described functions, operations, steps, etc.

The above-described controller and/or the components thereof may further include a memory implemented as a computer-readable non-temporary recording medium or a computer-readable temporary recording medium. The memory may be controlled by the above-described controller and/or the components thereof and configured to store data transmitted to or received from the above-described controller and/or the components thereof or configured to store data processed or to be processed by the above-described controller and/or the components thereof.

In the disclosed embodiments, the computer-readable code/algorithm/software may be implemented in the computer-readable recording medium. The computer-readable recording medium may be a computer-readable non-temporary recording medium, such as a data storage device capable of storing data that can be read by the processor/microprocessor. Examples of the computer-readable recording medium include a hard disk drive (HDD), a solid state drive (SSD), a silicon disk drive (SDD), a ROM, a CD-ROM, a magnetic tape, a floppy disk, an optical data storage device, etc.

What is claimed is:

1. An electric brake system comprising:
a reservoir in which a pressurizing medium is stored;
a master cylinder configured to pressurize and discharge the pressurizing medium stored in the reservoir;
a hydraulic pressure supply device configured to operate a hydraulic piston according to an electrical signal output in response to a displacement of a brake pedal and generate a hydraulic pressure;
a hydraulic pressure control unit configured to control the hydraulic pressure transmitted to a wheel cylinder from the hydraulic pressure supply device;
a hydraulic pressure auxiliary device configured to operate when the hydraulic pressure supply device is inoperable and provide the hydraulic pressure to two wheel cylinders, and including a pair of pumps configured to pressurize the pressurizing medium, a motor configured to drive the pair of pumps, a first support valve provided on a first auxiliary hydraulic pressure flow path for transmitting the pressurizing medium pressurized by any one of the pair of pumps to a first wheel cylinder to control a flow of the pressurizing medium, a first discharge valve to control a discharge of the pressurizing medium of the first wheel cylinder to the reservoir, a second support valve provided on a second auxiliary hydraulic pressure flow path for transmitting the pressurizing medium pressurized by the other of the pair of pumps to a second wheel cylinder to control the flow of the pressurizing medium and a second discharge valve to control a discharge of the pressurizing medium of the second wheel cylinder to the reservoir;
a pressure sensor configured to detect pressures of the pressurizing media transmitted to the first support valve and the second support valve from the pair of pumps; and
a controller configured to control the hydraulic pressure supply device, the hydraulic pressure control unit, and the hydraulic pressure auxiliary device,
wherein the controller is configured to estimate a wheel pressure of at least one control target wheel cylinder of the first wheel cylinder and the second wheel cylinder during anti-lock braking system (ABS) control in a first fallback mode performed by the hydraulic pressure auxiliary device, synchronize an upstream pressure and a downstream pressure of at least one control target support valve of the first support valve and the second support valve, and compensate the estimated wheel pressure of the control target wheel cylinder to be the pressure detected by the pressure sensor during the synchronization.

2. The electric brake system of claim 1, wherein the control target support valve is a normal closed type solenoid valve.

3. The electric brake system of claim 2, wherein the control target support valve is connected so that the pressurizing medium does not flow back even when the downstream pressure is higher than the upstream pressure.

4. The electric brake system of claim 2, wherein the controller is configured to fully open the control target support valve for a predetermined time to synchronize the upstream pressure and the downstream pressure of the control target support valve.

5. The electric brake system of claim 1, wherein the controller is configured to synchronize the upstream pressure and the downstream pressure of the control target support valve in a case of pressure boosting control of a first ABS control cycle, in a case in which a road surface is changed, or in a case in which two wheels ABS-controlled by the hydraulic pressure auxiliary device are both controlled to be decompressed.

6. The electric brake system of claim 1, wherein the controller is configured to determine whether to initiate the ABS control based on a wheel speed detected by a wheel speed sensor in the first fallback mode.

7. The electric brake system of claim 6, wherein the controller is configured to close the first and second support valves and open the first and second discharge valves, based on determining an initiation of the ABS control.

8. The electric brake system of claim 7, wherein the controller is configured to:
close the opened first discharge valve and the opened second discharge valve;
drive the motor; and
open the closed first support valve and the closed second support valve.

9. The electric brake system of claim 8, wherein the controller is configured to fully open the closed first support valve and the closed second support valve and then control a degree of opening of the fully open first support valve and the fully open second support valve.

10. The electric brake system of claim 9, wherein the controller is configured to compensate the estimated wheel pressure of the control target wheel cylinder with a pressure detected by the pressure sensor during fully opening the first support valve and the second support valve.

11. A method of controlling an electric brake system including a reservoir in which a pressurizing medium is stored, a master cylinder configured to pressurize and discharge the pressurizing medium stored in the reservoir, a hydraulic pressure supply device configured to operate a hydraulic piston according to an electrical signal output in response to a displacement of a brake pedal and generate a hydraulic pressure, a hydraulic pressure control unit configured to control the hydraulic pressure transmitted to a wheel cylinder from the hydraulic pressure supply device, and a hydraulic pressure auxiliary device configured to operate when the hydraulic pressure supply device is inoperable and provide the hydraulic pressure to two wheel cylinders, and including a pair of pumps configured to pressurize the pressurizing medium, a motor configured to drive the pair of pumps, a first support valve provided on a first auxiliary hydraulic pressure flow path for transmitting the pressurizing medium pressurized by any one of the pair of pumps to a first wheel cylinder to control a flow of the pressurizing medium, a first discharge valve to control a discharge of the pressurizing medium of the first wheel cylinder to the reservoir, a second support valve provided on a second auxiliary hydraulic pressure flow path for transmitting the pressurizing medium pressurized by the other of the pair of pumps to a second wheel cylinder to control the flow of the pressurizing medium and a second discharge valve to control a discharge of the pressurizing medium of the second wheel cylinder to the reservoir, the method comprising:
estimating a wheel pressure of at least one control target wheel cylinder of the first wheel cylinder and the second wheel cylinder during ABS control in a first fallback mode performed by the hydraulic pressure auxiliary device;
synchronizing an upstream pressure and a downstream pressure of at least one control target support valve of the first support valve and the second support valve;
detecting the upstream pressure of the control target support valve during the synchronizing through a pressure sensor configured to detect pressures of the pressurizing media transmitted to the first support valve and the second support valve from the pair of pumps; and
compensating the estimated wheel pressure of the control target wheel cylinder to be the detected upstream pressure.

12. The method of claim 11, wherein the control target support valve is a normal closed type solenoid valve, and
the synchronizing of the upstream pressure and the downstream pressure of the control target support valve includes fully opening the control target support valve for a predetermined time.

13. The method of claim 11, wherein the synchronizing of the upstream pressure and the downstream pressure of the control target support valve includes synchronizing the upstream pressure and the downstream pressure of the control target support valve in a case of pressure boosting control of a first ABS control cycle, in a case in which a road surface is changed, or in a case in which two wheels ABS-controlled by the hydraulic pressure auxiliary device are both controlled to be decompressed.

14. The method of claim 11, further comprising determining whether to initiate the ABS control based on a wheel speed detected by a wheel speed sensor in the first fallback mode.

15. The method of claim 14, further comprising closing the first and second support valves and opening the first and second discharge valves, based on determining an initiation of the ABS control.

16. The method of claim 15, further comprising:
closing the opened first discharge valve and the opened second discharge valve;
driving the motor; and
opening the closed first support valve and the closed second support valve.

17. The method of claim 16, wherein the opening of the closed first support valve and the closed second support valve comprises fully opening the closed first support valve and the closed second support valve and then controlling a degree of opening of the fully open first support valve and the fully open second support valve.

18. The method of claim 17, wherein the compensating of the estimated wheel pressure of the control target wheel cylinder comprises compensating the estimated wheel pressure of the control target wheel cylinder with a pressure detected by the pressure sensor during fully opening the first support valve and the second support valve.

* * * * *